US008547457B2

(12) United States Patent
Wolfe et al.

(10) Patent No.: US 8,547,457 B2
(45) Date of Patent: Oct. 1, 2013

(54) CAMERA FLASH MITIGATION

(75) Inventors: Andrew Wolfe, Los Gatos, CA (US); Thomas Martin Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 301 days.

(21) Appl. No.: 12/489,197

(22) Filed: Jun. 22, 2009

(65) Prior Publication Data

US 2010/0321559 A1 Dec. 23, 2010

(51) Int. Cl.
*H04N 5/20* (2006.01)
*H04N 5/222* (2006.01)

(52) U.S. Cl.
USPC .......................................... 348/255; 348/371

(58) Field of Classification Search
USPC .................................. 348/370, 371
See application file for complete search history.

(56) References Cited

U.S. PATENT DOCUMENTS

| 6,526,234 | B1 | 2/2003 | Malloy Desormeaux | |
| 7,245,325 | B2* | 7/2007 | Yamaguchi | 348/364 |
| 7,262,798 | B2 | 8/2007 | Stavely et al. | |
| 7,574,043 | B2* | 8/2009 | Porikli | 382/173 |
| 7,881,599 | B2* | 2/2011 | Omoto | 396/89 |
| 2003/0044066 | A1* | 3/2003 | Sakaguchi | 382/168 |
| 2003/0103159 | A1* | 6/2003 | Nonaka | 348/371 |
| 2005/0057682 | A1 | 3/2005 | Staller | |
| 2007/0223897 | A1* | 9/2007 | Kao | 396/4 |
| 2007/0262235 | A1* | 11/2007 | Pertsel | 250/208.1 |
| 2008/0226192 | A1* | 9/2008 | Silverstein et al. | 382/276 |
| 2008/0231714 | A1* | 9/2008 | Estevez et al. | 348/208.16 |
| 2008/0231742 | A1* | 9/2008 | Kurase | 348/333.01 |
| 2009/0003725 | A1* | 1/2009 | Merkel et al. | 382/274 |

FOREIGN PATENT DOCUMENTS

| JP | 2003-087653 A | 3/2003 |
| JP | 2003-169246 A | 6/2003 |
| JP | 2003-295251 A | 10/2003 |

OTHER PUBLICATIONS

"International Search Report dated Sep. 22, 2010 regarding Application No. PCT/US2010/038393".

* cited by examiner

*Primary Examiner* — Albert Cutler
(74) *Attorney, Agent, or Firm* — Dorsey & Whitney LLP

(57) ABSTRACT

Techniques are generally described for an image capture system that may include an image sensor, a flash for providing illumination, a data storage, and a processor operatively associated with the data storage. The processor may be adapted to execute computer implemented instructions to pre-store one or more image capture device characteristics in the data storage, acquire data in a pre-capture phase, model shadow effects based on either or both of the pre-stored data and the acquired data, modify one or more image capture device settings based on the modeled shadow effects, and record image data with the image sensor. Illumination may be provided substantially coincident with recording of the image data.

23 Claims, 8 Drawing Sheets

//CAMERA FLASH MITIGATION

BACKGROUND

Photographic systems produce a wide range of image quality when operated by amateur photographers. If the photographic environment for a given scene is well suited to the photographic system (e.g. ambient light level is uniform and of sufficient intensity), good results are typically obtained. However, when these conditions are not present, image defects may be introduced due to failures in the capture or reproduction system, thereby reducing the quality of the final viewed image. To minimize the effects of suboptimal image capture conditions, photographic systems have attempted to compensate by adding features intended to expand the range of light levels and distances where images may be captured. For example, if the intensity of the ambient light is insufficient to provide adequate exposure, and the primary subject is located less than a predetermined distance from the camera, most built-in electronic flash units are able to provide auxiliary illumination sufficient to at least partially expose the primary subject. However, even if the primary subject now receives adequate illumination, the flash may introduce image defects.

The image defect of shadowing may occur when auxiliary illumination is employed. Specifically, light from an auxiliary illumination source, or flash, may not reach one or more background objects due to obstruction by the photographic subject, and may appear in the final image as a darkened area behind the photographic subject, which is often undesirable in terms of image quality. This objectionable phenomenon is understood to be visible in the final image at least in part because of a displacement between the lens and the flash mounted in, or to, the camera housing.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
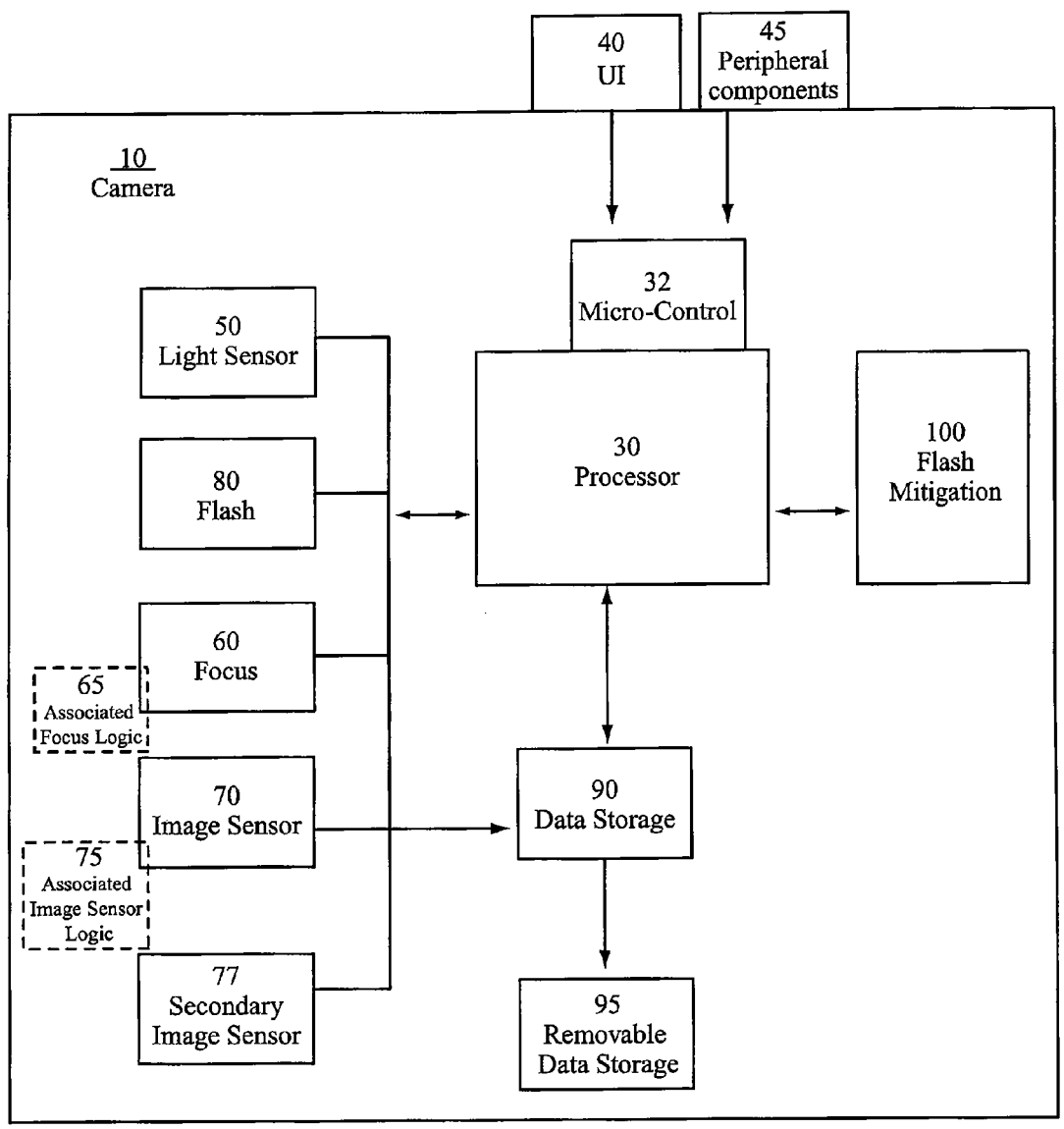
FIG. 1 depicts a block diagram of an image capture system such as a digital camera apparatus in accordance with some examples.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

In some examples, the present disclosure may relate to pre-processing systems and methods of mitigating defects in captured digital image data resulting from the use of an auxiliary illumination source. More particularly, in an illustrative example, the present disclosure may relate to mitigation of shadow effects in captured digital image data resulting from the use of an auxiliary illumination source. Such processes and methods may, for example, enable amateur photographers to take higher quality photos without requiring time consuming and expensive post-processing techniques. In further examples, data obtained during pre-processing may be used in post-processing.

FIG. 1 depicts a block diagram of an image capture system such as a digital camera apparatus in accordance with some examples of the present disclosure. The image capture system, hereinafter referred to as camera 10, may include a processor 30. It is appreciated that many of the processes implemented in the camera 10 may be implemented in or controlled by software operating in a microprocessor, central processing unit (CPU), controller, digital signal processor (DSP) and/or an application specific integrated circuit (ASIC), collectively depicted as block 30 and termed as "processor". In various examples, more or fewer components may be included in processor 30. Peripheral components, such as components for direct user viewing or manipulation, and including, for example, such as buttons and a display may be included. Generally, a user interface (UI) 40 and/or the peripheral components 45 may be controlled by a microcontroller 32. The processor 30, in response to a user input at micro-controller 32, such as for example pressing a shutter button or other suitable means, may initiate and control the digital photographic process.

Figure 2:
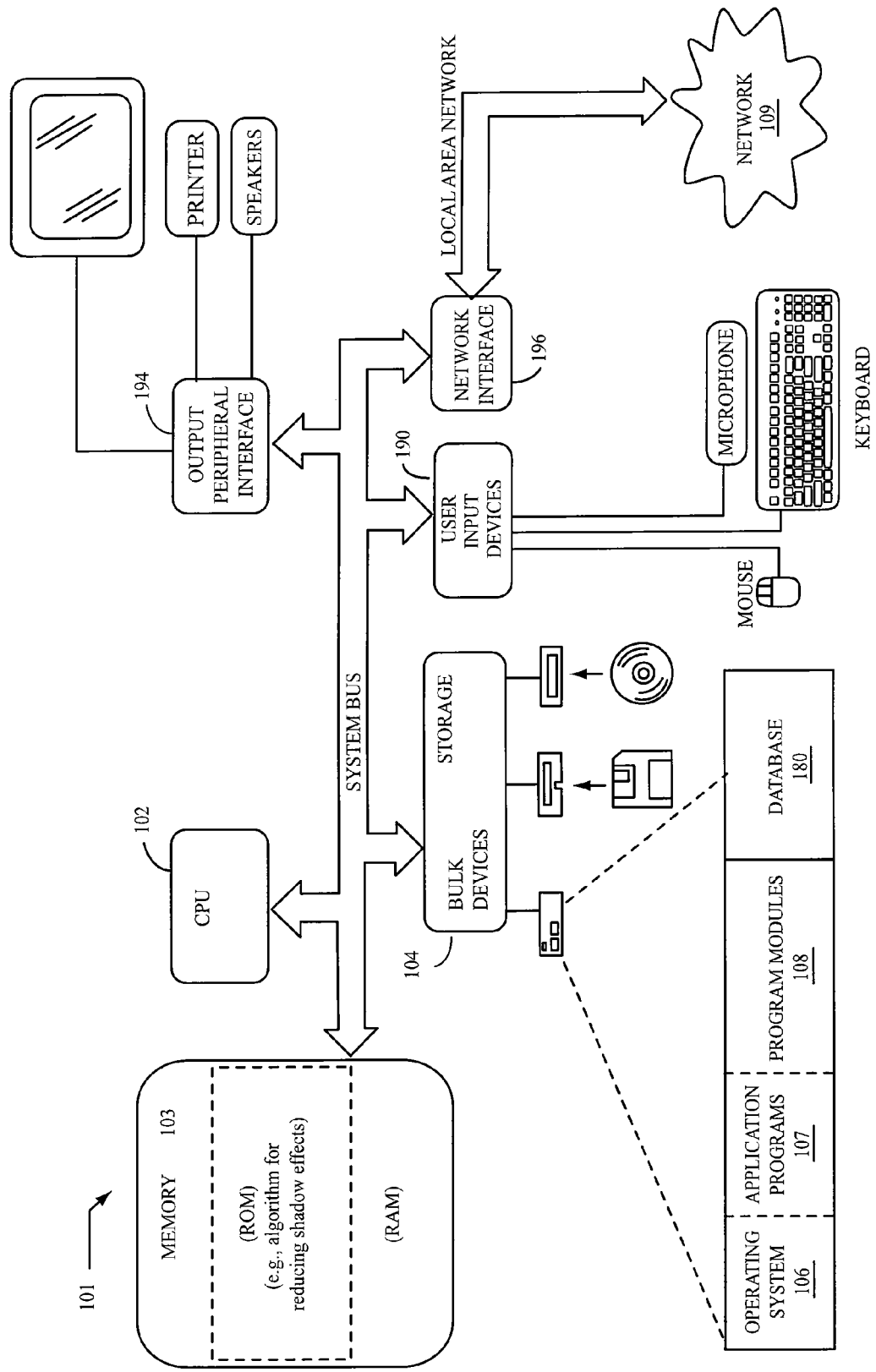
FIG. 2 depicts a computing system for implementing examples of the present disclosure.

With reference to FIG. 2, depicted is a computing system for implementing examples of the present disclosure. The computing system of FIG. 2 includes a computer 101, including a central processing unit (CPU), also referred to as a processor, 102, main memory 103 and one or more bulk storage devices 104. The processor 102 may generally be of any desired configuration including but not limited to a microprocessor (µP), a microcontroller (µC), a digital signal processor (DSP), or any combination thereof. Thus, individual processors 102 may include logic for executing program instructions as well as other functional blocks such as an arithmetic logic unit (ALU), a floating point unit (FPU), a digital signal processing (DSP) core, registers, accumulators, etc. The main memory 103, which may be any suitable form of memory including, but not limited to, volatile memory such as random access memory (RAM), non-volatile memory such as read only memory (ROM) and flash memory storage, data storage devices such as magnetic disk storage (e.g., hard disk drive or HDD), tape storage, optical storage (e.g., compact disk or CD, digital versatile disk or DVD), or other machine-readable storage mediums that may be removable, non-removable, volatile or non-volatile. An algorithm for reducing shadow effects within a digital image may be provided in the main memory 103, such as, for example, in the ROM.

The bulk storage devices 104 and their associated computer storage media provide storage of computer readable instructions, data structures, program modules and other data for the computer 101. The bulk storage devices 104 may also include an operating system 106, application programs 107, program modules 108, and a database 180. The computer 101 further includes user input devices 190 through which a user may enter commands and data. Input devices may include an electronic digitizer, a microphone, a keyboard and pointing device, commonly referred to as a mouse, trackball or touch pad. Other input devices may include a joystick, game pad, satellite dish, scanner, or the like.

These and other input devices may be coupled to the processor 102 through a user input interface that is coupled to a system bus, but may be coupled by other interface and bus structures, such as a parallel port, game port or a universal serial bus (USB). Computers such as computer 101 may also include other peripheral output devices such as speakers, which may be coupled through an output peripheral interface 194 or the like.

The computer 101 may operate in a networked environment using logical connections to one or more computers, such as a remote computer coupled to network interface 196. The remote computer may be a personal computer, a server, a router, a network PC, a peer device or other common network node, and may include many or all of the elements described above relative to computer 101. The remote computer may be considered the other of the client or the server depending on the designation of the computer 101. Networking environments are commonplace in offices, enterprise-wide area networks (WAN), local area networks (LAN), intranets and the Internet. Source and destination machines need not be coupled by a network 109 or any other means, but instead, data may be migrated via any media capable of being written by the source platform and read by the destination platform or platforms. In some examples, the network may be a wireless network such as a wireless local area network (WLAN). When used in a LAN or WLAN networking environment, the computer 101 is coupled to the LAN through a network interface 196 or an adapter. When used in a WAN networking environment, computer 101 typically includes a modem or other means for establishing communications over the WAN, such as the Internet or network 109. It will be appreciated that other means of establishing a communications link between the computers may be used.

Referring again to FIG. 1, in illustrative examples, the camera 10 may include a light sensor 50. Light sensor 50 may be used to determine ambient light exposure. Ambient light exposure may be useful in determining whether a flash should be used. Camera 10 may also include an image sensor 70. Image sensor 70 may include any component suitable for capturing digital image data, such as for example, a charge coupled device (CCD), complementary metal oxide semiconductor (CMOS), and the like. In some examples, the image sensor 70 may use associated image sensor logic 75 to analyze captured images to develop the image data. In one example, the camera 10 may also include a secondary image sensor 77. For example, secondary image sensor 77 may have a lower resolution than image sensor 70.

In some examples, camera 10 may further include a focus component 60. The focus component 60 may focus an image on the image sensor 70. Additionally, the focus component 60, may determine various scene-related distances, such as for example the distance to a primary subject and/or the distance to background objects. In one example, the focus component 60 may use associate focus component logic 65 to determine the various scene-related distances.

Still further, the camera 10 may include an auxiliary illumination, or flash component 80, which may generate a photographic flash in substantial coincidence with the recording of digital image data by image sensor 70 upon actuation by a user, such as for example, depression of a shutter button. Flash component 80 may be formed into the camera housing or configured as a removable attachment to the camera 10. A flash may be selectively generated by flash component 80 in response to the light sensor 50, such as upon the light sensor 50 sensing that the ambient light is below a threshold level, or upon manual input from a user of the camera 10. In some examples, the processor 30 may accept scene related information from one or more of the aforementioned sensors/components to be recorded with the digital record for use in pre-processing and/or post-processing of digital image data.

In some examples, digital image data and/or data associated therewith may be stored in a data storage component 90, which may comprise any suitable computer memory such as, for example, dynamic random access memory or a non-volatile memory. A removable storage device 95, such as for example a CF card, SD card, or the like may further be used to store digital image data and/or data associated therewith.

In some examples, a flash mitigation system 100 may be implemented in any computing and/or processing environments, including but not limited to computer software, firmware, device driver, digital electronic circuitry or computer hardware, or any combination of these. In one example, the flash mitigation system 100 may be integral to the camera 10 and may comprise a set of instructions running on processor 30. In some examples, on the basis of pre-stored information and/or scene related information received by processor 30, flash mitigation system 100 may model properties and/or characteristics of shadow effects resulting from a camera flash and appearing on one or more background objects. Flash mitigation system 100 may also approximate camera setting adjustments to eliminate or substantially reduce shadow effects in captured image data. While the present disclosure is described with respect to examples where shadow effects may be produced as a result of a camera flash, it is to be appreciated that the systems and methods of the present disclosure may be employed to mitigate shadow effects resulting from any illumination source.

Figure 3:
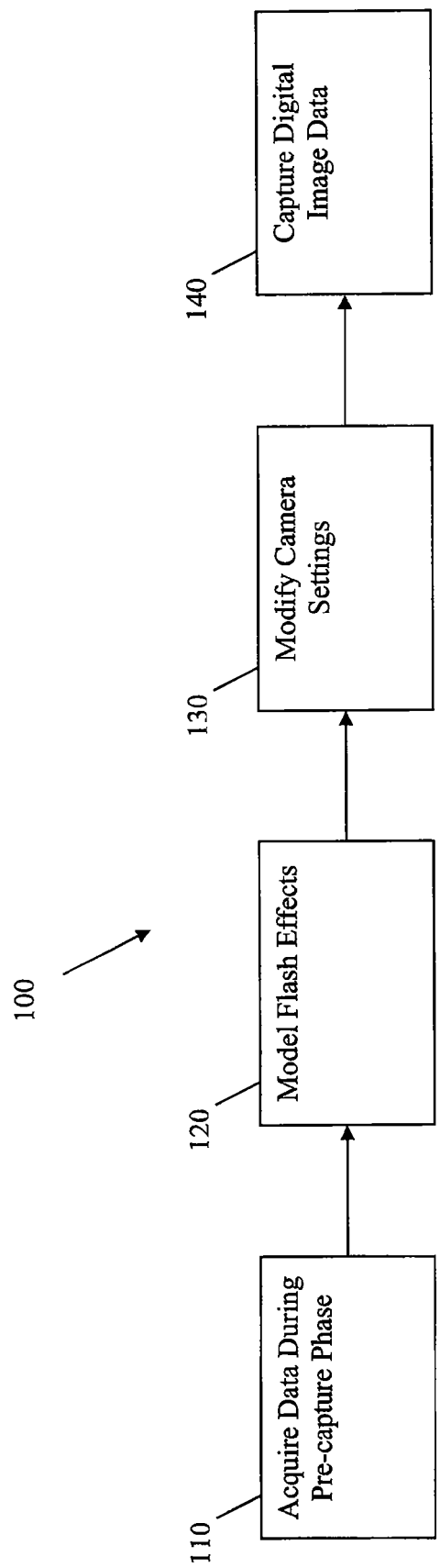
FIG. 3 depicts a process flow diagram of operation of a flash mitigation system in accordance with some examples.

FIG. 3 depicts a process flow diagram of operation of a flash mitigation system 100 in accordance with some examples of the present disclosure. Flash mitigation system 100 may acquire scene related data during a pre-capture phase (block 110). Pre-capture phase may refer to a phase, which occurs prior to capturing of image data, in which the camera detects or senses environment parameters. For example, ambient light levels may be detected via light sensor 50 or image sensors 70 or 77. As a further example, the distance to the primary subject and/or the distance to one or more background objects may be determined via the focus component 60 or by measuring reflected light from flash component 80 using light sensor 50 or via image sensors 70 or 77. As yet another example, characteristics of shadows resulting from a pre-flash may be detected via one or more device components, such as for example the focus component 60, the image sensor 70, and/or the secondary image sensor 77. The pre-flash may be effected using the flash component 80. Alternatively, the pre-flash may be effected using other means. Using pre-stored data, such as a flash offset displacement discussed with respect to FIG. 4a, and/or the acquired scene related data, the system may then model shadow effects likely to be cast on background objects as a result of auxiliary illumination (block 120). On the basis of the modeled shadow effects, the flash mitigation system 100 may modify one or more camera settings such that shadows cast upon one or more background objects as a result of the flash are eliminated or substantially reduced (block 130). After camera setting modification, image data may be captured or recorded by the image sensor 70 and stored to the data storage 90 and/or the removable data storage 95 (block 140).

Figure 4A:
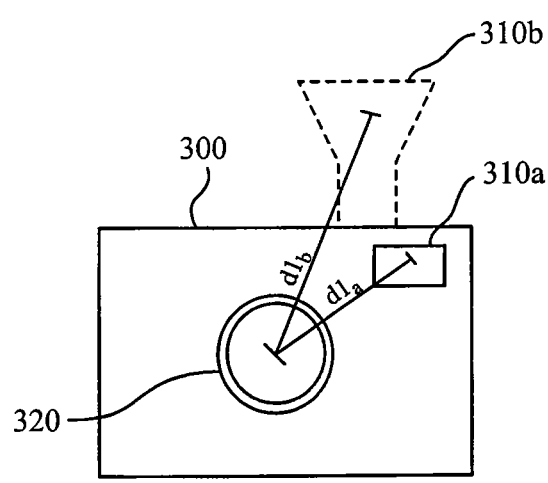
FIG. 4a depicts a camera suitable for use with systems in accordance with some examples.

As an initial matter, in some examples, one or more camera characteristics may be pre-stored to the data storage 90. FIG. 4a depicts a camera 300 suitable for use with systems in accordance with some examples disclosed herein. As shown, the camera 300 may include a built-in flash 310a and/or a removable flash 310b which are offset from a lens 320 by a displacement $d1_a$ and a displacement $d1_b$, respectively (the "flash offset displacement(s)"). In some examples, the camera 300 may be configured to sense whether built-in flash 310a or removable flash 310b is employed. As discussed above, the flash offset displacement, at least in part, causes shadow effects resulting from the camera flash to be visible in a captured image. In some example, flash offset displacements may be pre-stored to data storage 90. Alternatively, any useful characteristics of camera 10 may be pre-stored to data storage 90.

In some examples, acquisition of data during a pre-capture phase (block 110) may include acquisition of one or more parameters which allow for modeling/estimating of shadow effects resulting from the camera flash. In some examples, one or more scene-related distances may be estimated and stored to the data storage 90.

Figure 4B:
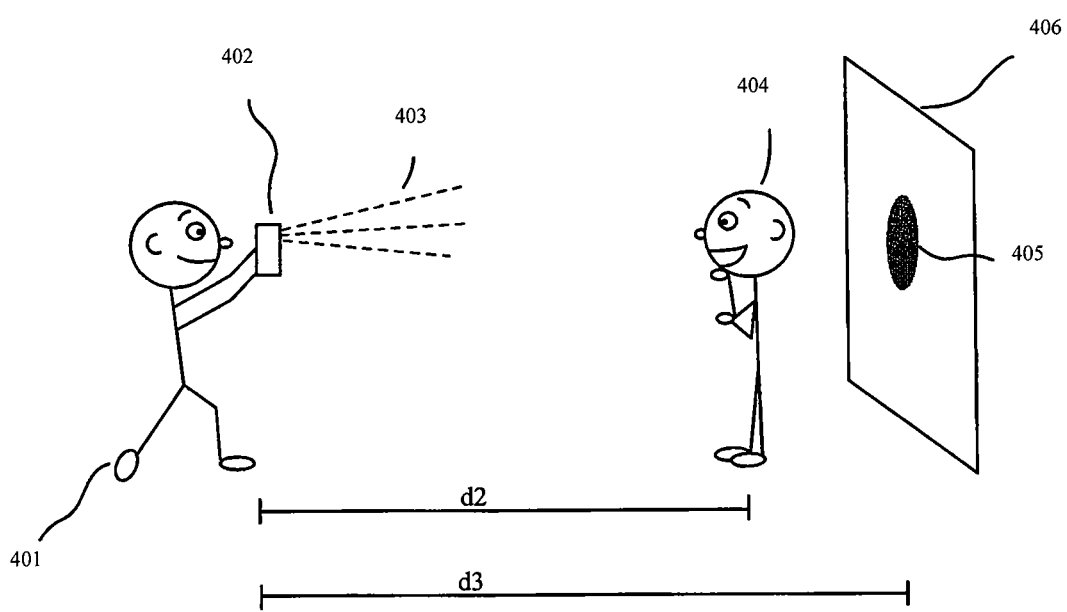
FIG. 4b depicts a diagram of an image capture scene in accordance with an illustrative example.

FIG. 4b depicts a diagram of an image capture scene in accordance with an illustrative example of the present disclosure. As shown, a user 401 may capture an image of a primary target 404, or focal point, using a camera 402 with the aid of auxiliary illumination 403. As also shown, the auxiliary illumination may result in a shadow 405 being cast on an object 406 in the scene background. In some examples, a focusing component of the camera 402 may approximate the distance to the primary target, shown as d2. In further examples, the focusing component may scan the scene to approximate the distance to one or more background objects, such as a distance d3 between the camera 402 and a background object 406. In some examples, either or both of the distance to the primary target and the distance to background objects may be stored to the data storage 90 or other suitable storage location. Generally, distances dl, d2, and/or d3 may be used to determine an angle at which shadow effects will be cast on a background object and/or more reliably predict the location of shadow effects in captured image data.

In further examples, data acquisition during pre-capture phase (block 110) may include acquiring data associated with a pre-flash. A pre-flash, generally, may refer to a flash which is emitted from the camera prior to and separate from the flash emitted in substantial coincidence with the recording of captured image data. Generation of a pre-flash may create shadow effects likely to appear in captured image data. In some examples, upon pre-flash generation, the system may retrieve data relating to characteristics/properties of produced shadows, such as for example, the darkness, shape, and/or size of the shadow. In illustrative examples, an edge detection algorithm is used to determine the boundary of the shadow and thus which pixels in the acquired image are impacted by the shadow. In various examples, in substantial coincidence with the pre-flash, the image sensor 70 and/or the secondary image sensor 77 may record one or more pre-capture images of the scene. The pre-capture images may be stored to the data storage 90 for analysis by flash mitigation system 100. It is to be understood that the pre-flash of the present disclosure may also be employed as part of a red-eye reduction system, as is known in the art, or alternatively, may be separate from such systems.

In some examples, using pre-stored data and/or data gathered during the pre-capture phase, the flash mitigation system 100 may model the shadow effects cast upon background objects (block 120). For example, in one example, on the basis of any or all of the flash offset distance, distance to the primary target, distance to one or more background objects, pre capture images, or combinations thereof, the system may model the shadow effects behind the primary target, such as for example, the darkness, size, and/or extent of the shadow. The location of the shadowed pixels within the image may be estimated by using the angle between each pixel in the image related to the primary target 404, the illumination source, and the image sensor and then modeling the projection of the illumination source along this angle to the background object 406. This angle can be calculated from the displacement dl and the distance d2 and then projected to distance d3. Image processing techniques such as edge detection, can be used to refine the estimation of which pixels are in shadow.)

It will be appreciated that a digital image comprises a plurality of individual pixels of varying color and shade and that groupings of these pixels are what make up the digital image. In an illustrative example, modeling of the flash effects (block 120) may include identifying the individual pixels or region of pixels in one or more stored pre-capture images which correspond to a shadow area. In this regard, the flash mitigation system 100 may include a pixel locator for locating pixels in a pre-capture image having properties indicative of shadowing. In some examples, the identified pixels may, at least in part, define a modeled shadow. Alternatively, the flash mitigation system 100 may include any components useful for detecting and eliminating shadow effects.

In some examples, on the basis of the modeled shadow, the flash mitigation system 100 may automatically adjust one or more camera settings such that the shadow effects are eliminated or substantially reduced (block 130). Camera settings can be adjusted on a per pixel, per-line, or per group-of-pixel basis in order to compensate for the illumination differential caused by the flash-induced shadow. Camera settings that may be adjusted include any conventional camera settings such as, for example, pixel gain, pixel offset, shutter speed, exposure, ISO settings, and the like. Alternatively, any appropriate camera settings may be adjusted. In some examples, one or more of the camera settings may be pre-set at default values. In further examples, the camera settings may be modified manually by a user and/or automatically by the camera.

The flash mitigation system 100 may adjust the properties of the individual pixels or region of pixels corresponding to the area of the modeled shadow effects. In this regard, the flash mitigation system 100 may include a pixel modifier for modifying the properties of identified pixels. In some examples, flash mitigation system 100 may individually and dynamically adjust the gain of each identified pixel or group of pixels, for example, by increasing the gain to compensate for low contrast resulting from shadow effects. In one example, flash mitigation system 100 may individually and dynamically adjust the exposure of each identified pixel or group of pixels, for example by increasing the exposure to compensate for darkness resulting from shadow effects. The systems for adjusting gain and exposure described herein are in contrast to known systems, which adjust gain on an image basis (i.e., the gain for each of the pixels that comprise an image are adjusted by the same amount) as opposed to an individual pixel or group of pixels basis. It is to be appreciated that for purposes of post-processing of image data captured in accordance with the systems and methods of the present disclosure, the individual pixel gain and/or exposure adjustments may need to be known. In this regard, as will be discussed in greater detail below, metadata comprising, at least in part, individual pixel adjustments may be stored to data storage 90 and associated with the captured image data.

In illustrative examples, after camera settings have been modified (block 130), digital image data may be captured by image sensor 70 (block 140). The captured image data may be displayed on an image display, stored to data storage 90, stored to removable storage 95, and/or downloaded to another device, such as a personal computer, server, or printer via an image output component, or otherwise processed.

Figure 5:
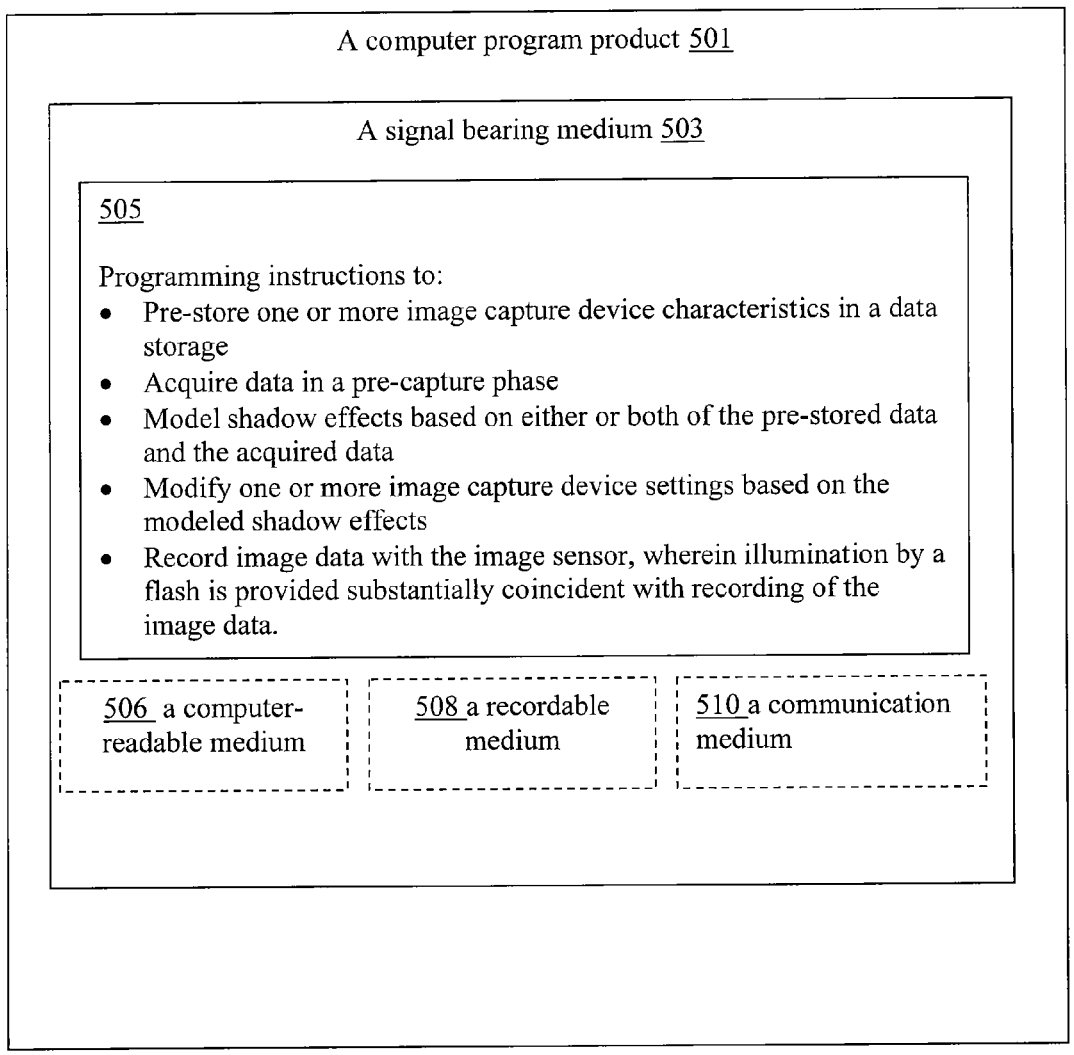
FIG. 5 depicts a block diagram of an example computer program product in accordance with the present disclosure.

FIG. 5 illustrates a block diagram of an example computer program product 501 arranged in accordance with the present disclosure. In some examples, as shown in FIG. 5, computer program product 501 includes a signal bearing medium 503 that may also include programming instructions 505. Programming instructions 505 may be arranged to pre-store one or more image capture device characteristics in a data storage. Programming instructions 505 may also be arranged to acquire data in a pre-capture phase. Further, programming instructions 505 may also be arranged to model shadow effects based on either or both of the pre-stored data and the acquired data. Still further, programming instructions 505 may be arranged to modify one or more image capture device settings based on the modeled shadow effects. Further yet, programming instructions 505 may be arranged to record image data with the image sensor, wherein illumination by a flash is provided substantially coincident with recording of the image data.

Also depicted in FIG. 5, in some examples, computer product 501 may include one or more of a computer readable medium 506, a recordable medium 508 and a communications medium 510. The dotted boxes around these elements may depict different types of mediums that may be included within, but not limited to, signal bearing medium 503. These types of mediums may distribute programming instructions 505 to be executed by computer devices including processors, logic and/or other facility for executing such instructions. Computer readable medium 506 and recordable medium 508 may include, but are not limited to, a flexible disk, a hard disk drive (HDD), a Compact Disc (CD), a Digital Video Disk (DVD), a digital tape, a computer memory, etc. Communications medium 510 may include, but is not limited to, a digital and/or an analog communication medium (e.g., a fiber optic cable, a waveguide, a wired communication link, a wireless communication link, etc.).

Figure 6A:
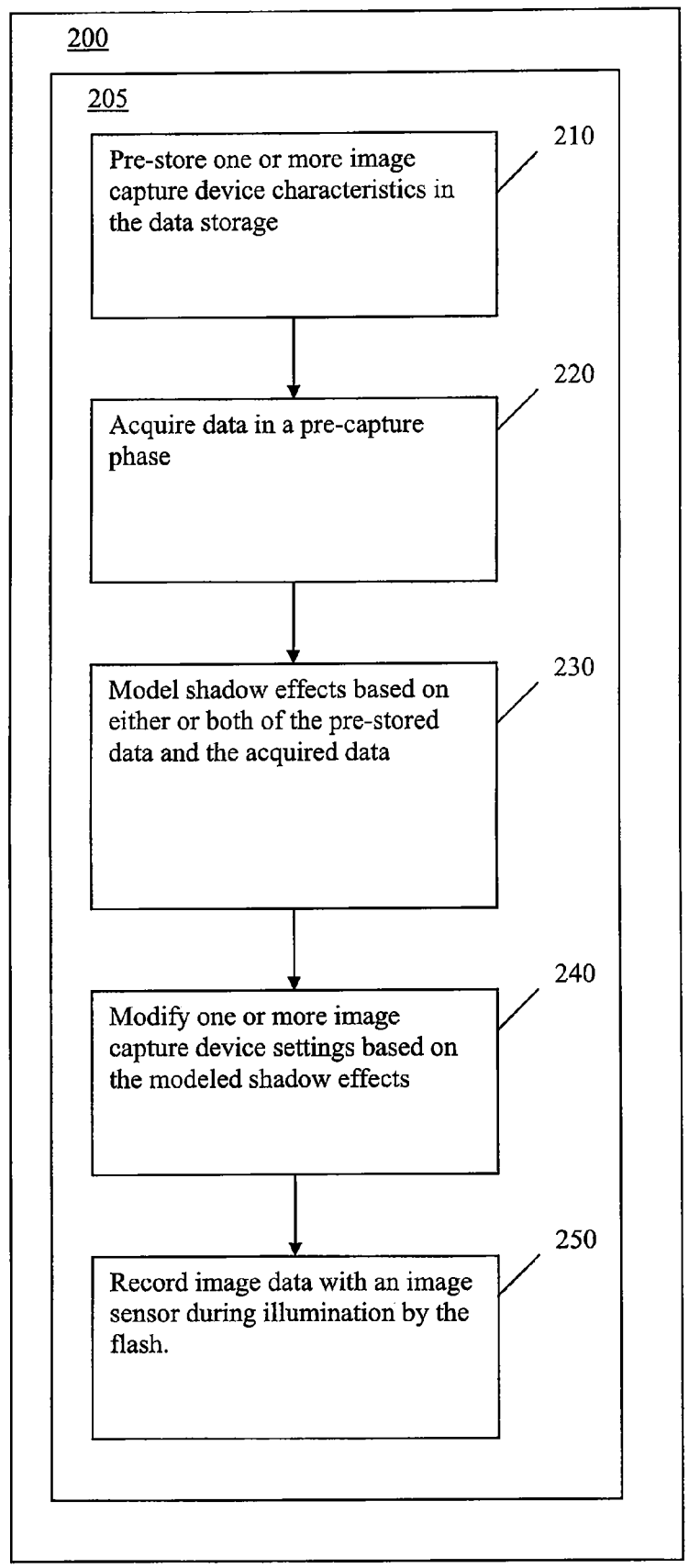
FIG. 6a depicts a computer system including a processor configured for performing an example of a method for minimizing shadow effects within a digital image in accordance with some examples.

In some particular examples, as shown in the schematic of FIG. 6a, a computer system 200 may include a processor 205 configured for performing an example of a method for minimizing shadow effects within a digital image in accordance with some examples of the present disclosure. In other examples, various steps or portions of various steps of the method may be performed outside of the processor 205. In various examples, the method may include pre-storing one or more image capture device characteristics in the data storage 90 (block 210). The method may then include acquiring data in a pre-capture phase (block 220). Next, the method may include modeling shadow effects based on either or both of the pre-stored data and the acquired data (block 230). The method may then include modifying one or more image capture device settings based on the modeled shadow effects (block 240). Finally, the method may include recording image data with the image sensor 70, wherein illumination may be provided substantially coincident with recording of the image data (block 250).

Figure 6B:
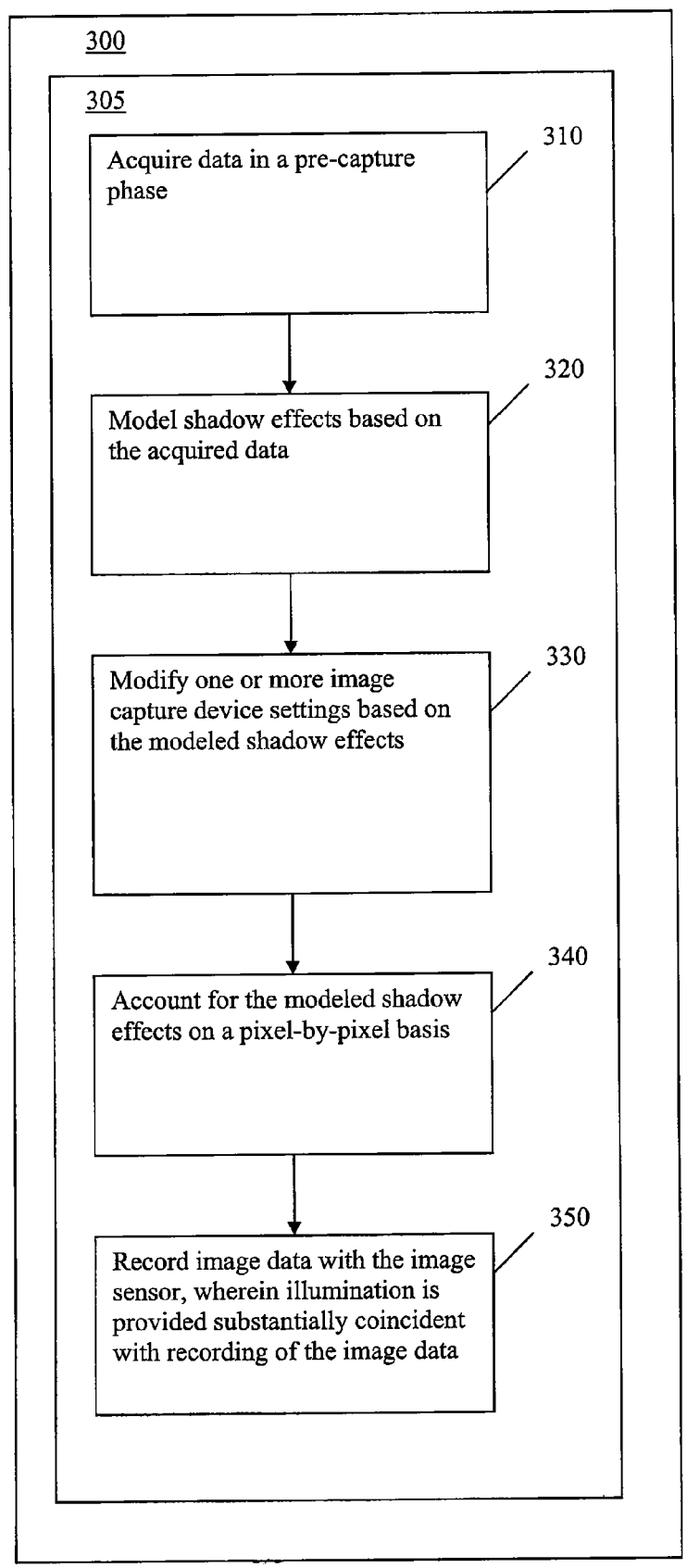
FIG. 6b depicts a computer system including a processor configured for performing an example of a method for minimizing shadow effects within a digital image in accordance with some examples.

In another particular example, as shown in the schematic of FIG. 6b, a computer system 300 may include a processor 305 configured for performing an example of a method for minimizing shadow effects within a digital image in accordance with some examples of the present disclosure. In other examples, various steps or portions of various steps of the method may be performed outside of the processor 305. In various examples, the method may include acquiring data in a pre-capture phase (block 310). The method may then include modeling shadow effects based on the acquired data (block 320). Next, the method may include modifying one or more image capture device settings based on the modeled shadow effects (block 330). The method may then include accounting for the modeled shadow effects on a pixel-by-pixel basis (block 340). Finally, the method may include recording image data with the image sensor, wherein illumination is provided substantially coincident with recording of the image data (block 350).

In some examples, non-image information, or metadata, may be stored along with the captured image data. The metadata may be stored as part of non-image header data in a digital image file, or may be stored in any form of digital memory associated with the digital image file. Stored metadata may be used to support post-processing of the digital image data, and may include any information relating to the captured image data. For example, metadata may include any or all of the offset displacement, distance to primary targets, distance to one or more background objects, pre-image data, shadow model data, camera settings (e.g., gain adjustments for each pixel), and the like. Alternatively, metadata may include any information useful for post-processing of the captured image data.

Figure 7:
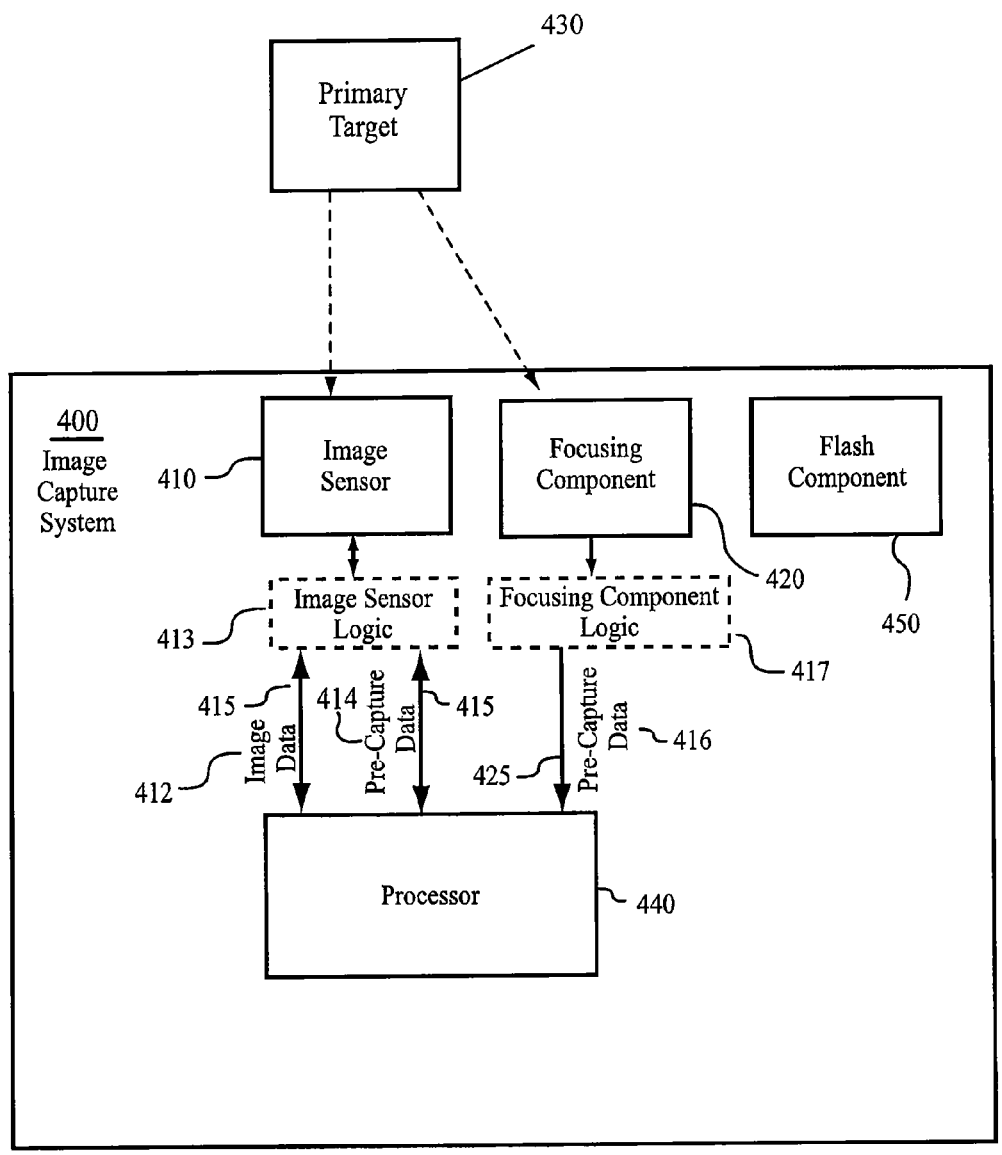
FIG. 7 depicts a schematic diagram of an image capture system in accordance with some examples.

FIG. 7 depicts a schematic diagram of an image capture system 400 in accordance with some examples of the present disclosure. One or more components of the image capture system 400, such as image sensor 410 and focusing component 420 may be used separately or in combination to acquire data relating to a primary target 430 during a pre-capture phase. In some examples, data acquired by the image sensor 410 may comprise image data 412 and/or pre-capture data 414. As previously described, the image sensor 410 may use associated image sensor logic 413 to analyze captured images to develop the image data 412 or pre-capture data 414. Data acquired from the focusing component may comprise pre-capture data 416. As previously described, the focusing component 420 may use associate focusing component logic 417 to analyze captured images to develop pre-capture data 416. The acquired data, including any of the pre-capture data 414, the image data 412, or the pre-capture data 416 may be transferred from the image sensor 410 and the focusing component 420 to a processor 440 via data buses 415 and 425, respectively. The processor 440 may model shadow effects based on the acquired data. The processor 440 may modify one or more image capture device settings, such as one or more settings of the image sensor 410, which may be communicated to the image sensor 410 and associated logic 413 via data bus 415. The processor 440 may account for the modeled shadow effects on a pixel-by-pixel basis. The image sensor 410 may record image data relating to the primary target 430. Illumination may be generated by a flash component 450 before and/or during the recording of image data.

The foregoing describes various examples of pre-processing systems and methods of mitigating defects in captured digital image data resulting from the use of an auxiliary illumination source. Following are specific examples of systems and methods of minimizing shadow effects within a digital image. These are for illustration only and are not intended to be limiting.

The present disclosure generally relates to systems for capturing images. The described systems may include an image sensor, a flash for providing illumination, a data storage, and a processor operatively associated with the data storage. The processor may be operatively associated with the data storage and adapted to execute computer implemented instructions to pre-store one or more image capture device characteristics in the data storage, acquire data in a pre-capture phase, model shadow effects based on either or both of the pre-stored data and the acquired data, modify one or more image capture device settings based on the modeled shadow effects, and record image data with the image sensor during illumination by the flash.

In some further described systems, an image capture system may include an image sensor, a flash for providing illumination, a data storage, and a processor operatively associated with the data storage. The processor may be operatively associated with the data storage and adapted to execute computer implemented instructions to acquire data in a pre-capture phase, model shadow effects based on the acquired data, modify one or more image capture device settings based on the modeled shadow effects, account for the modified shadow effects on a pixel-by-pixel basis, and record image data with the image sensor. Illumination may be provided substantially coincident with recording of the image data.

The present disclosure also generally relates to computer accessible mediums having stored thereon computer executable instructions for processing an image when the executable instruction are executed by a processing unit of an image capture device that includes an image sensor and a data storage. The instructions may cause the processing unit to perform a process of reducing shadow effects within a digital image. In some examples, the described processes may include pre-storing one or more image capture device characteristics in the data storage, acquiring data in a pre-capture phase, modeling shadow effects based on either or both of the pre-stored data and the acquired data, modifying one or more image capture device settings based on the modeled shadow effects, and recording image data with the image sensor. The illumination may be provided substantially coincident with recording of the image data.

The present disclosure further generally relates to methods for minimizing shadow effects within a digital image. In some examples, the methods may include acquiring data in a pre-capture phase, modeling shadow effects on the basis of the acquired data, modifying one or more image capture device settings on the basis of the modeled shadow effects, accounting for the modeled shadow effects on a pixel-by-pixel basis, and recording image data with an image sensor during illumination by the flash.

The present disclosure is not to be limited in terms of the particular examples described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. An image capture system to minimize shadow effects in image data associated with a digital image of a scene, the image capture system comprising:
   an image sensor;
   a flash to illuminate the scene;
   a data storage; and
   a processor operatively associated with the data storage and adapted to execute computer implemented instructions to:
     pre-store one or more image capture device characteristic in the data storage;
     acquire scene related data in a pre-capture phase including recordation of a pre-capture image with a pre-flash;
     model shadow effects cast upon background objects based on the acquired scene related data including the pre-capture image;
     modify one or more image capture device settings used during image capture based on the modeled shadow effects, wherein the one or more image capture device settings used during image capture include one or more gains associated with the image sensor; and
     following the re-capture phase, record image data with the image sensor using the modified settings during illumination of the scene by the flash.

2. The image capture system of claim 1, wherein the one or more pre-stored image capture device characteristics comprises a flash offset distance.

3. The image capture system of claim 1, wherein the scene related data acquired during the pre-capture phase includes a distance to a primary target in the scene determined by any or all of the image sensor, a focus component, or a light sensor.

4. The image capture system of claim 1, wherein the scene related data acquired during the pre-capture phase includes characteristics of shadow effects produced by the pre-flash, wherein the pre-flash is generated by the flash, and wherein the characteristics of the shadow effects are determined by either or both of the image sensor and a focus component.

5. The image capture system of claim 1, wherein the scene related data acquired during the pre-capture phase includes one or more pre-capture images recorded by the image sensor in substantial coincidence with the pre-flash, wherein the pre-flash is generated by the flash.

6. The image capture system of claim 5, wherein the processor is further adapted to execute computer implemented instructions to identify individual pixels in the pre-capture image indicative of shadowing.

7. The image capture system of claim 1, wherein the processor is further adapted to execute computer implemented instructions to model the shadow effects based on one or more of a flash offset distance and a distance to a primary target in the scene.

8. The image capture system of claim 1, wherein to model the shadow effects, the processor is further adapted to execute computer implemented instructions to approximate one or more of darkness, size, and/or shape of an identified shadow in the pre-capture image.

9. The image capture system of claim 8, wherein the processor is further adapted to execute computer implemented instructions to individually and dynamically adjust a gain associated with each pixel corresponding to the identified shadow in the pre-capture image.

10. The image capture system of claim 1, wherein the processor is further adapted to execute computer implemented instructions to account for the modeled shadow effects on a pixel-by-pixel basis.

11. The image capture system of claim 1, wherein the processor is further adapted to execute computer implemented instructions to activate the flash to illuminate the scene substantially coincident with recordation of the image data.

12. The image capture system of claim 1, wherein the one or more image capture device settings used during image capture further include shutter speed, ISO settings, or combinations thereof.

13. A non-transitory computer accessible medium having stored thereon computer executable instructions to minimize shadow effects in image data associated with a digital image of a scene when the computer executable instruction are executed by a processing unit of an image capture device, wherein the image capture device includes an image sensor to capture the image data of a scene, a flash to illuminate the scene, and a data storage to record the captured image data, the computer executable instructions to process the image data comprising:
   pre-storing one or more image capture device characteristics in the data storage;
   acquiring scene related data in a pre-capture phase including acquiring, using the image sensor, a pre-capture image with a pre-flash;
   modeling shadow effects cast upon background objects based on the acquired scene related data including the pre-capture image;
   modifying one or more image capture device settings used during image capture based on the modeled shadow effects, wherein the one or more image capture device settings used during image capture include one or more gains associated with the image sensor; and
   following the pre-capture phase, recording image data with the image sensor using the modified settings, wherein the illumination of the scene by the flash is provided substantially coincident with recording of the image data.

14. The computer accessible medium of claim 13, wherein the pre-stored image capture device characteristics comprise a flash offset distance.

15. The computer accessible medium of claim 13, wherein the scene related data acquired during the pre-capture phase further includes a distance to a primary target.

16. The non-transitory computer accessible medium of claim 13, wherein the one or more image capture device settings used during image capture further include shutter speed, ISO settings, or combinations thereof.

17. A method for an image capture device to minimize shadow effects in image data associated with a digital image of a scene, wherein the image capture device includes a flash, an image sensor, and a data store, the method comprising:

acquiring scene related data in a pre-capture phase including recording using the image sensor, a pre-capture image with a pre-flash;

modeling shadow effects cast upon background objects on the basis of the acquired scene related data including the pre-capture image;

modifying one or more image capture device settings for the image capture device used during image capture based on the modeled shadow effects, wherein modifying the one or more image capture device settings includes modifying one or more gains associated with the image sensor carried out on a pixel-by-pixel basis; and following the pre-capture phase, recording image data with the image sensor using the modified settings during illumination of the scene by the flash.

18. The method of claim 17, further comprising pre-storing one or more image capture device characteristics in the data store and wherein the modifying one or more image capture device settings is done based on the pre-stored data and the acquired scene related data.

19. The method of claim 18, wherein the pre-stored image capture device characteristics comprise a flash offset distance.

20. The method of claim 17, wherein the scene related data acquired during the pre-capture phase further includes a distance to a primary target.

21. The method of claim 17, wherein the modeling the shadow effects includes approximating darkness, size, and/or shape of an identified shadow in the pre-capture image.

22. The method of claim 21, wherein the modifying the one or more image capture device settings comprises individually and dynamically adjusting the gain of each pixel corresponding to the identified shadow.

23. The method of claim 17, wherein the modifying one or more image capture device settings further includes adjusting one or more of shutter speed, ISO settings, or combinations thereof.

* * * * *

UNITED STATES PATENT AND TRADEMARK OFFICE
CERTIFICATE OF CORRECTION

PATENT NO.         : 8,547,457 B2                                                    Page 1 of 1
APPLICATION NO.    : 12/489197
DATED              : October 1, 2013
INVENTOR(S)        : Wolfe et al.

It is certified that error appears in the above-identified patent and that said Letters Patent is hereby corrected as shown below:

In the Specification

In Column 6, Line 28, delete "in shadow.)" and insert -- in shadow. --, therefor.

In the Claims

In Column 11, Lines 41-42, in Claim 1, delete "characteristic" and insert -- characteristics --, therefor.

In Column 11, Line 54, in Claim 1, delete "re-capture" and insert -- pre-capture --, therefor.

In Column 13, Line 1, in Claim 14, delete "computer" and insert -- non-transitory computer --, therefor.

In Column 13, Line 4, in Claim 15, delete "computer" and insert -- non-transitory computer --, therefor.

In Column 13, Line 15, in Claim 17, delete "recording" and insert -- recording, --, therefor.

<p align="right">Signed and Sealed this<br/>Third Day of June, 2014</p>

<p align="center">Michelle K. Lee<br/><i>Deputy Director of the United States Patent and Trademark Office</i></p>